United States Patent
Zhao et al.

(10) Patent No.: US 9,589,381 B2
(45) Date of Patent: Mar. 7, 2017

(54) COPYING OF ANIMATION EFFECTS FROM A SOURCE OBJECT TO AT LEAST ONE TARGET OBJECT

(75) Inventors: Jason Xiaobo Zhao, San Jose, CA (US); Xiaoyan Shi, Saratoga, CA (US); Jiang Zhang, Santa Clara, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 975 days.

(21) Appl. No.: 12/138,401

(22) Filed: Jun. 12, 2008

(65) Prior Publication Data
US 2009/0309881 A1 Dec. 17, 2009

(51) Int. Cl.
*G06T 13/00* (2011.01)
(52) U.S. Cl.
CPC .................................. *G06T 13/00* (2013.01)
(58) Field of Classification Search
USPC ......................................................... 345/473
See application file for complete search history.

(56) References Cited

U.S. PATENT DOCUMENTS

| | | | |
|---|---|---|---|
| 5,512,918 A | 4/1996 | Forrest et al. | |
| 5,940,076 A | 8/1999 | Sommers et al. | |
| 6,011,562 A | 1/2000 | Gagne et al. | |
| 6,222,540 B1 | 4/2001 | Sacerdoti | |
| 6,433,784 B1* | 8/2002 | Merrick | G06F 3/0481 345/473 |
| 6,714,202 B2* | 3/2004 | Dorrell | H04N 19/00 345/474 |
| 6,898,759 B1* | 5/2005 | Terada | G10H 1/0066 345/473 |

(Continued)

FOREIGN PATENT DOCUMENTS

| | | |
|---|---|---|
| JP | 02216588 A | 8/1990 |
| JP | H0683877 A | 3/1994 |

(Continued)

OTHER PUBLICATIONS

Weverka, Peter; PowerPoint 2007 All-In-One Desk Reference for Dummies; Jan. 10, 2007; Wiley Publishing, Inc.; pp. 22, 78, 79, 88, 348, 411, 414, 419, 422, 433, 442,443.*

(Continued)

*Primary Examiner* — James A Thompson
(74) *Attorney, Agent, or Firm* — Dave Ream; Tom Wong; Micky Minhas (57) ABSTRACT

A method and a processing device may be provided for copying animation effects of a source object to one or more target objects of a presentation. The source object and the target objects may be included in presentation templates, or presentation slides of presentation files. The one or more target objects may be included in a same presentation slide as the source object, a different presentation slide as the source object, a same presentation file as the source object, a different presentation file as a source object, a same presentation template as a source object, or a different presentation template as the source object. Animation effects that are supported by a target object may be copied from the source object to the target object. When copying one or more animation effects from the source object to multiple target objects, timing of the animation effects may be serial or concurrent.

20 Claims, 4 Drawing Sheets

(56) References Cited

U.S. PATENT DOCUMENTS

| | | | |
|---|---|---|---|
| 6,957,389 | B2 | 10/2005 | Faraday et al. |
| 7,262,775 | B2 | 8/2007 | Calkins et al. |
| 7,336,264 | B2 | 2/2008 | Cajolet et al. |
| 2004/0001106 | A1 | 1/2004 | Deutscher et al. |
| 2004/0033475 | A1* | 2/2004 | Mizuma et al. ............. 434/219 |
| 2005/0044485 | A1 | 2/2005 | Mondry et al. |
| 2005/0275636 | A1 | 12/2005 | Dehlin et al. |
| 2006/0136823 | A1* | 6/2006 | Dokuni ......................... 715/530 |
| 2007/0016578 | A1* | 1/2007 | Melman ............................ 707/5 |
| 2007/0033574 | A1 | 2/2007 | Nirell et al. |
| 2007/0091095 | A1 | 4/2007 | Chen |
| 2008/0028312 | A1* | 1/2008 | Alvarez et al. ............... 715/719 |
| 2008/0034292 | A1 | 2/2008 | Brunner et al. |

FOREIGN PATENT DOCUMENTS

| | | |
|---|---|---|
| JP | H07239947 A | 9/1995 |
| JP | 2001111751 A | 4/2001 |
| JP | 2003223649 A | 9/2003 |
| JP | 2005339272 A | 12/2005 |
| JP | 2006174309 A | 6/2006 |
| JP | 2006186617 A | 7/2006 |
| KR | 1020060004909 A | 1/2006 |
| KR | 1020060006990 A | 1/2006 |
| RU | 2006113596 A | 9/2006 |
| TW | 200515304 A | 5/2005 |
| TW | 200717358 A | 5/2007 |
| TW | 200813804 A | 3/2008 |
| WO | 03038759 A1 | 5/2003 |

OTHER PUBLICATIONS

Weverka, Peter; PowerPoint 2007 All-In-One Desk Reference for Dummies; Jan. 10, 2007; Wiley Publishing, Inc.; Chapter 5.*
Weverka. PowerPoint 2007 All-in-one Desk Refernce for Dummies. Jan. 2007.*
Weverka. PowerPoint 2007 All in One Desk Reference for Dummies. Jan. 2007. p. 141.*
Weverka, PowerPoint 2007 All-in-One Desk Reference for Dummies. 2007. p. 423.*
"International Search Report", Filed Date May 12, 2009, Application No. PCT/US2009/043525, pp. 1-11.
"Reuse Animations", retrieved at <<http://synfig.org/Reuse_Animations, pp. 4.
"Sharing Shape Animation between Objects, Models, and Scenes", retrieved at http://softimage.wik.avid.com/xsidocs/shape_anim_SharingShapeAnimationbetweenObjectsModelsandScenes.htm, pp. 3.
"Adobe Flash CS3 Professional", 2008, Overstock.com, pp. 4.
First Office Action issued Sep. 28, 2012, in Chinese Patent Application No. 200980122472.1, 11 pages.
Weverka, Peter; PowerPoint 2007 All-In-One Desk Reference for Dummies; Jan. 10, 2007; Wiley Publishing, Inc., 34 pages.
Second Office Action issued Dec. 14, 2012, in Chinese Patent Application No. 200980122472.1, 6 pages.
Third Office Action issued Feb. 17, 2013, in Chinese Patent Application No. 200980122472.1, 9 pages.
Office Action issued May 14, 2012 in Mexican Patent Application No. MX/a/2010/012822, 4 pages.
Fourth Office Action issued May 10, 2013, in Chinese Patent Application No. 200980122472.1, 9 pages.
Office Action issued Feb. 1, 2013 in Mexican Patent Application No. MX/a/2010/012822, 4 pages.
Final Office Action issued Oct. 10, 2013, in Chinese Patent Application No. 200980122472.1, 8 pages.
"PptEXTREME Edit for Powerpoint", Retrieved from <<http://www.pptxtreme.com/edit.asp>>, Sep. 22, 2004, 3 Pages.
"Office Action Issued in Korean Patent Application No. 10-2010-7027338", Mailed Date: Aug. 30, 2015, 09 Pages.
"Office Action Issued in Korean Patent Application No. 10-2010-7027338", Mailed Date: Mar. 30, 2016, 7 Pages.
"Office Action Issued in Canadian Patent Application No. 2,722,925", Mailed Date: Mar. 21, 2016, 3 Pages.
"Office Action Issued in Australian Patent Application No. 2009257930", Mailed Date: May 12, 2014, 7 Pages.
"Office Action Issued in Australian Patent Application No. 2009257930", Mailed Date: Sep. 4, 2014, 4 Pages.
"Office Action Issued in Israel Patent Application No. 208805", Mailed Date: Aug. 3, 2015, 16 Pages. (W/O English Translation).
"Office Action Issued in Israel Patent Application No. 208805", Mailed Date: Jul. 30, 2015, 8 Pages. (W/O English Translation).
"Office Action Issued in Israel Patent Application No. 208805", Mailed Date: Feb. 18, 2014, 10 Pages.
"Office Action Issued in Canadian Patent Application No. 2722925", Mailed Date: Aug. 7, 2015, 4 Pages.
"Office Action Issued in Taiwan Patent Application No. 98116036", Mailed Date: May 20, 2014, 5 Pages.
Bajaj, Geetesh, "Animation Carbon", Retrieved from http://web.archive.org/web/20040609191425/http://www.indezine.com/products/powerpoint/addin/animationcarbon.html, Jun. 9, 2004, 3 Pages.
"Office Action Issued in Mexico Patent Application No. MX/a/2010/012822", Mailed Date: May 7, 2015, 10 Pages.
"Office Action Issued in Malaysian Patent Application No. PI 2010005329", Mailed Date: Jan. 30, 2015, 3 Pages.
Pillai, S., "Animation Carbon—Home Page", Retrieved from http://skp.mvps.org/ac/index.html, Jan. 8, 2005, 4 Pages.
Sony Creative Software Inc—'Sony Vegas Movie Studio 8—Quick Guide Manual' —Nov. 1, 2007 [Retrieved on Mar. 5, 2014]. Retrieved from Internet: <URL:http://www.sonycreativesoftware.com/download/manuals/vegasfamily>.
Adobe Systems Incorporated—'Adobe Premiere Pro CS3—User Guide'—Apr. 1, 2008 [Retrieved on Mar. 5, 2014]. Retrieved from Internet: <URL:help.adobe.com/archive/en_US/premierepro/cs3/premierepro_cs3_help.pdf>.
Apple Inc.—'Final Cut Pro v6 User Manual'—2007 [Retrieved on Mar. 5, 2014]. Retrieved from Internet: <URL: manuals.info.apple.com/en_US/Final_Cut_Pro_6_User_Manual.pdf>.
First Office Action issued Mar. 6, 2014, in Australian Patent Application No. 2009257930, 6 pages.
"Notice of Allowance Issued in Korean Patent Application No. 10-2010-7027338", Mailed Date: Jun. 30, 2016, 2 Pages. (W/o English Translation).
"Notice of Allowance Issued in Russian Federation Patent Application No. 2010150813", Mailed Date: Apr. 25, 2013, 6 Pages.
"Notice of Allowance Issued in Japanese Patent Application No. 2011-513527", Mailed Date: Mar. 26, 2013, 6 Pages.

* cited by examiner

COPYING OF ANIMATION EFFECTS FROM A SOURCE OBJECT TO AT LEAST ONE TARGET OBJECT

BACKGROUND

Presentation applications permit users to add animation effects to one or more objects of a presentation. The animation effects may include fade in, fade out, fly in, spin, grow, and shrink, as well as many other animation effects, or different animation effects. Timings of the animation effects may occur after an occurrence of an event such as, for example, clicking on an object with a pointing device, after completion of a previous animation effect, simultaneously with one or more other animation effects, or after an occurrence of another event.

Some presentation applications provide a facility for a user to create complicated custom animation effects for an object. Creation of complicated custom animation effects may be difficult and time consuming. If a user of existing presentation applications sees animation effects, which the user desires to copy to other objects in a same or different presentation, the user may spend a considerable amount of time painstakingly recreating the animation effects with respect to each of the other objects.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

In embodiments consistent with the subject matter of this disclosure, a processing device and a method may be provided for copying one or more animation effects of a source object of a presentation file or a presentation template to one or more target objects of a same presentation file, a different presentation file, a same presentation template, or a different presentation template.

In some embodiments, a simple user interface may be provided, such that a user may select a source object, may indicate a copy animation operation, and may select one or more target objects. When copying animation effects of a source object to one or more target objects, timing information, with respect to the source object, may be merged with timeline information of a presentation slide, or a presentation template, including the one or more target objects, such that the copied animation effects may be performed serially or concurrently.

When no animation effects are copied from a source object to a target object, an audio or visual indication may be provided. When at least one animation effect is copied from a source object to a target object, a preview of the at least one animation effect may be displayed automatically.

In some embodiments, only animation effects supported by a target object may be copied from a source object to the target object. Copying of other animation effects to the target object may be skipped.

DRAWINGS

In order to describe the manner in which the above-recited and other advantages and features can be obtained, a more particular description is described below and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

DETAILED DESCRIPTION

Embodiments are discussed in detail below. While specific implementations are discussed, it is to be understood that this is done for illustration purposes only. A person skilled in the relevant art will recognize that other components and configurations may be used without parting from the spirit and scope of the subject matter of this disclosure.

Overview

In embodiments consistent with the subject matter of this disclosure, a presentation application may permit copying of one or more animation effects of a source object of a presentation to one or more target objects of a same presentation or a different presentation.

A user interface may permit a user to select a source object having one or more animation effects. The user may select the source object by clicking a pointing device on the source object. In other embodiments, a source object may be selected by using keys of a keyboard, an electronic pen on a display monitor, a user's finger on a touchscreen, or via other methods and/or input devices. The user may indicate a desired operation, such as, for example, copying of one or more animation effects of an object by selecting a displayed icon or text representing the desired operation and by selecting one or more target objects, to which the one or more animation effects of the source object are to be copied. The desired operation may be indicated by the user selecting the displayed icon or text, representing the desired operation, and the one or more target objects may be selected by the user clicking on the one or more target objects using a pointing device, or by the user using keys of a keyboard, an electronic pen on a display monitor, a user's finger on a touchscreen, or other methods and/or input devices. After selection of the one or more target objects, the one or more animation effects of the source object may be copied to the one or more target objects.

In some embodiments, a desired operation for moving one or more animation effects of a source object to a single target object may be indicated by a single-click of a pointing device on an icon, or text, representing a copy animation effects operation. A desired operation for moving one or more animation effects of a source object to multiple target objects may be indicated by a double-click of the pointing device on the icon, or the text, representing the copy animation effects operation.

After selecting a target object, all animation effects of the target object may be deleted and timing information, with respect to the deleted animation effects, may be deleted from an animation timeline of a presentation slide, which includes the target object. Timing information of the animation timeline of the presentation slide may be merged, such that gaps in the timing information resulting from deletion of the animation effects, may be eliminated. Timing information of the one or more animation effects of the source object may be merged and added to the animation timeline of the presentation slide, which includes the target object.

Exemplary Processing Device

Figure 1:
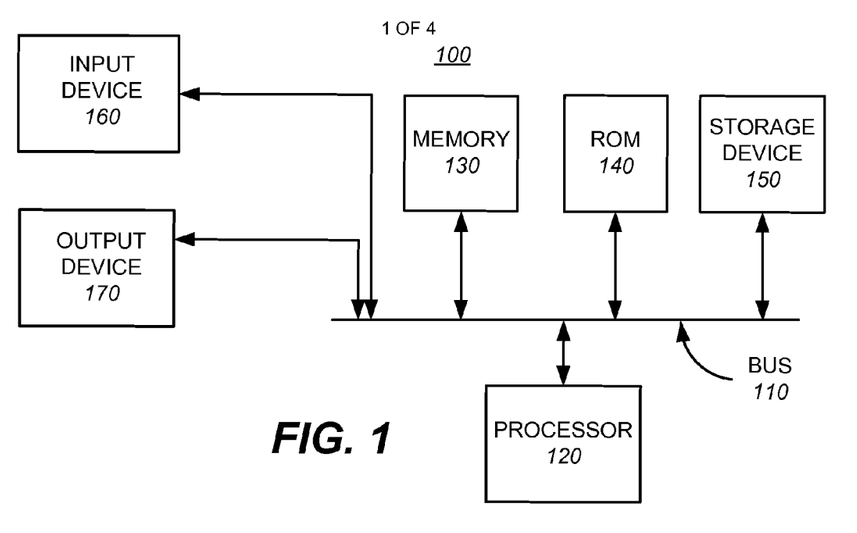
FIG. 1 is a functional block diagram of a processing device which may implement embodiments consistent with subject matter of this disclosure.

FIG. 1 is a functional block diagram of an exemplary processing device 100, which may be used in embodiments consistent with the subject matter of this disclosure. Processing device 100 may include a bus 110, an input device 160, a memory 130, a read only memory (ROM) 140, an output device 170, a processor 120, and a storage device 150. Bus 110 may permit communication among components of processing device 100.

Processor 120 may include at least one conventional processor or microprocessor that interprets and executes instructions. Memory 130 may be a random access memory (RAM) or another type of dynamic storage device that stores information and instructions for execution by processor 120. Memory 130 may also store temporary variables or other intermediate information used during execution of instructions by processor 120. ROM 140 may include a conventional ROM device or another type of static storage device that stores static information and instructions for processor 120. Storage device 150 may include compact disc (CD), digital video disc (DVD), a magnetic medium, or other type of machine-readable storage medium for storing data and/or instructions for processor 120.

Input device 160 may include a keyboard, a touchscreen, or other input device. If input device 160 includes a touchscreen, the touchscreen may further include a digitizer for receiving input from a writing device, such as, for example, an electronic or non-electronic pen, a stylus, a user's finger, or other writing device. In one embodiment, input device 160 may include a pointing device, such as, for example, a computer mouse, or other pointing device. Output device 170 may include one or more conventional mechanisms that output information, including one or more display monitors, or other output devices.

Processing device 100 may perform such functions in response to processor 120 executing sequences of instructions contained in a machine-readable storage medium, such as, for example, memory 130, ROM 140, storage device 150 or other machine-readable storage medium. Such instructions may be read into memory 130 from another machine-readable storage medium or from a separate device via a communication interface (not shown).

Exemplary Display

Figure 2:
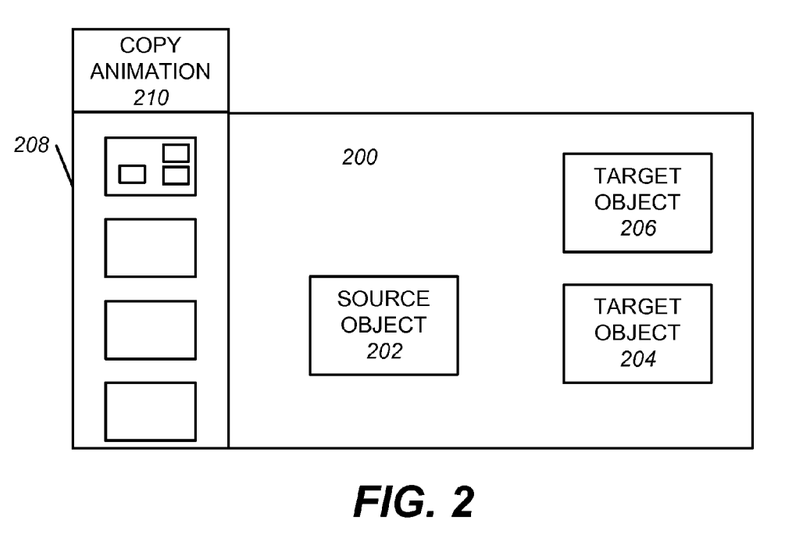
FIG. 2 illustrates an exemplary display, including a presentation slide.

FIG. 2 illustrates an exemplary display of a presentation slide 200 of a presentation file. Presentation slide 200 may include a source object 202 and target objects 204, 206. The exemplary display may also include a thumbnail pane 208, which may display thumbnail images of presentation slides included in the presentation file.

A user may select source object 202 by, for example, clicking on a source object 202 with a pointing device, or via another selection method. The user may indicate a copy animation operation by selecting a copy animation icon or text 210 in a same manner as used for selecting source object 202, or via another selection method. In one embodiment, the user may indicate a copy animation to single target object operation by single-clicking on copy animation icon or text 210 with a pointing device. The user may indicate a copy animation to multiple target objects operation by double-clicking on copy animation icon or text 210 with the pointing device, of via another selection method.

When the user indicates a copy animation to single target object operation, the user may select a single target object, such as, for example, target object 204 or target object 206, by single clicking target object 204 or target object 206 with a pointing device, or via another selection method. After indicating the copy animation to single target object operation, copy animation icon or text 210 may be highlighted until the single target object is selected.

When the user indicates a copy animation to multiple target objects operation, the user may select multiple target objects, such as, for example, target object 204 and target object 206, by single clicking each of target object 204 and target object 206 with a pointing device, or via another selection method. After indicating the copy animation to multiple target objects operation, copy animation icon or text 210 may be highlighted until an occurrence of an event indicating that no further target objects are to be selected. One example of the event indicating that no further target objects are to be selected may include clicking on a portion of a presentation in an area in which objects are absent. The event may also include pressing of a particular key on a keyboard, or other actions.

The user may select one or more target objects included in a different presentation slide than a presentation slide having the source object. For example, the user may select, from thumbnail pane 208, a thumbnail image, corresponding to a presentation slide having a target object, such that the presentation slide having the target object may replace a display of presentation slide 200. The user may then select the target object.

Further, the user may select one or more target objects included in a different presentation file. In some embodiments, the user may select one or more target objects in the different presentation file by pressing a combination of keys of a keyboard, such that a previously open presentation application window of the different presentation file becomes active. A slide of the different presentation file may then be displayed and the one or more target objects may then be selected.

Exemplary Processing

Figure 3:
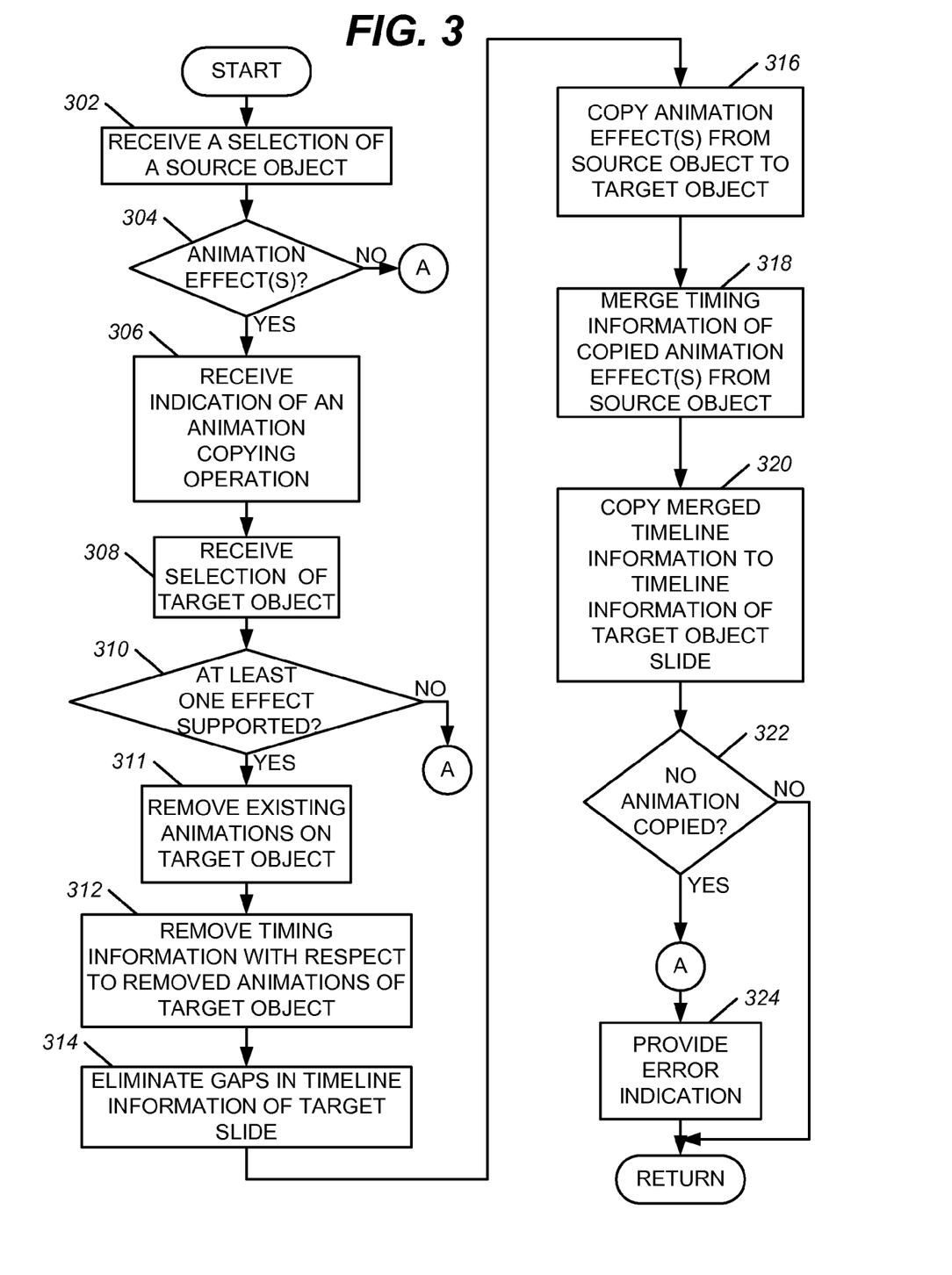
FIGS. 3-5 are flowcharts illustrating exemplary processes, which may be performed in embodiments consistent with the subject matter of this disclosure.

FIG. 3 is a flowchart illustrating an exemplary process for copying one or more animation effects from a source object to a target object, in embodiments consistent with the subject matter of this disclosure. The source object and the target object may be a placeholder, a shape, clip art, multimedia content, a container including a number of items, such as, for example, enumerated items or bulleted items, or another type of object included in a presentation file.

The process may begin with a processing device, such as, for example, processing device 100, receiving a selection of a source object of a presentation (act 302). The source object may be an object included in a presentation slide of a presentation, or an object included in a presentation template, which may be used to create a presentation slide of a presentation. The processing device may then determine whether the selected source object has one or more associated animation effects (act 304). The animation effects may include random effects, dissolve in, flashing, expand, fade, faded zoom, ascend, center revolve, shrink, grow, flying in, fly out, and/or other or different animation effects.

If the processing device determines that the source object does not have any associated animation effects, then the processing device may provide an error indication (act 324). The error indication may include a particular sound, a notification presented on a display screen, or other audio and/or visual indication.

If the processing device determines that the source object has one or more associated animation effects, then the processing device may receive an indication of an animation copying operation (act 306). A user may provide the indication of the animation copying operation by single-clicking, with a pointing device, a displayed copy animation icon or text, by pressing one or more keys of a keyboard, or via other methods.

The processing device may then receive a selection of a target object (act 308). The target object may be an object included in a same presentation slide as the source object, a different presentation slide than the presentation slide having the source object, a presentation slide included in a different presentation file than the source object, or a presentation template, which may be used to create presentation slides.

A particular animation effect may be supported with respect to one type of object and may be unsupported with respect to another type of object. For example, an animation effect of "play" may be supported for a movie object, but may be unsupported for a shape object, such as, for example, a rectangle, or other shape object. The processing device may determine whether any of the one or more animation effects of the source object are supported with respect to the target object (act 310). If none of the one or more animation effects of the source object are supported by the target object, then the processing device may provide an error indication (act 324). Otherwise, all existing animation effects with respect to the target object may be deleted (act 311).

Presentation slides and presentation templates, which include one or more animation effects, may have associated timing information with respect to timing of one or more animation effects of objects included in the presentation slides and the presentation templates. The processing device may remove timing information, with respect to the removed one or more animation effects of the target object, from timeline information of the presentation slide including the target object or timeline information of the presentation template including the target object (act 312). Removal of the timing information, with respect to the removed one or more animation effects of the target object may create gaps in the timeline information of the presentation slide including the target object or the presentation template including target object. The processing device may eliminate any gaps in the timeline information of the presentation slide including the target object or the presentation template including the target object (an act 314).

The processing device may then copy the one or more animation effects from the source object to the target object (act 316). The processing device may merge timing information, with respect to the copied one or more animation effects from the source object (act 318) and may copy the merged timing information to the timeline information of the presentation slide or the presentation template including the target object (act 320).

In various embodiments, each animation effect may have one of a number of timings, such as, for example, on click, after previous, and with previous. An on click timing for an animation effect may indicate that the animation effect is to be performed upon receiving a click from a pointing device. On click timings of animation effects of a source object may be merged with the timeline information of the presentation slide or the presentation template including the target object, such that, the on click timings of the animation effects may occur after a last event of any timing. If timeline information of the presentation slide or the presentation template, including the target object, does not exist, then the on click timing may be a first timing of the timeline information.

An after previous timing for an animation effect may indicate that the animation effect is to be performed after a previous event of any timing. After previous timings of animation effects of a source object may be merged with the timeline information of the presentation slide or the presentation template including the target object, such that, the after previous timings of the animation effects may occur after a last event of any timing. If timeline information of the presentation slide or the presentation template, including the target object, does not exist, then the after previous timing may be a first timing of the timeline information.

A with previous timing for an animation effect may indicate that the animation effect is to be performed concurrently with a previous event. With previous timings of animation effects of a source object may be merged with the timeline information of the presentation slide or the presentation template including the target object, such that, the with previous timings of the animation effects may occur concurrently with a last event of having an on click timing or an after previous timing. If no on-click timings or after previous timings occur in the timeline information of the presentation slide or the presentation template, including the target object, then the with previous timing may be a first timing on the merged timeline.

A triggered animation effect may be an animation effect that occurs after a particular event, such as clicking of a pointing device on a particular object, or another event. The timings with respect to a triggered animation effect of a source object may be merged with the timeline information of the presentation slide or the presentation template, including the target object, such that, the timings may be added as timings for non-triggered animation effects. That is, triggered animation effects of the source object may be copied to the target object, but corresponding timings of the triggered animation effects may be merged with the timeline information of the presentation slide or the presentation template, including the target object, such that the timings are non-triggered timings occurring after all other non-triggered timings for animation effects. Multiple triggered animation timings of the source object may be merged with the timeline information of the presentation slide or the presentation template, including the target object, in an order that corresponding triggered animation effects were added to the source object. In one embodiment, triggered animation timings from the source object may be merged with the timeline information of the presentation slide or the presentation template, including the target object, such that corresponding animation effects may occur after completion of a previously last, non-triggered, animation effect.

Returning to FIG. 3, the processing device may determine whether any animation effects of the source object were successfully copied to the target object (act 322). If no animation effects were successfully copied, then the processing device may provide an error indication (act 324), as previously discussed.

Objects may include bulleted lists, diagrams, or charts, each of which may be a collection of several member objects having different animation effects and timings. Target objects may also include a collection of a different number of the member objects than a source object. In embodiments consistent with the subject matter of this disclosure, animation effects and timings of a first member object of a source object may be copied to all member objects of the target object. If the first member object of the source object has no animation effect, then no animation effects may be copied from the source object to the member objects of the target object.

Figure 4:
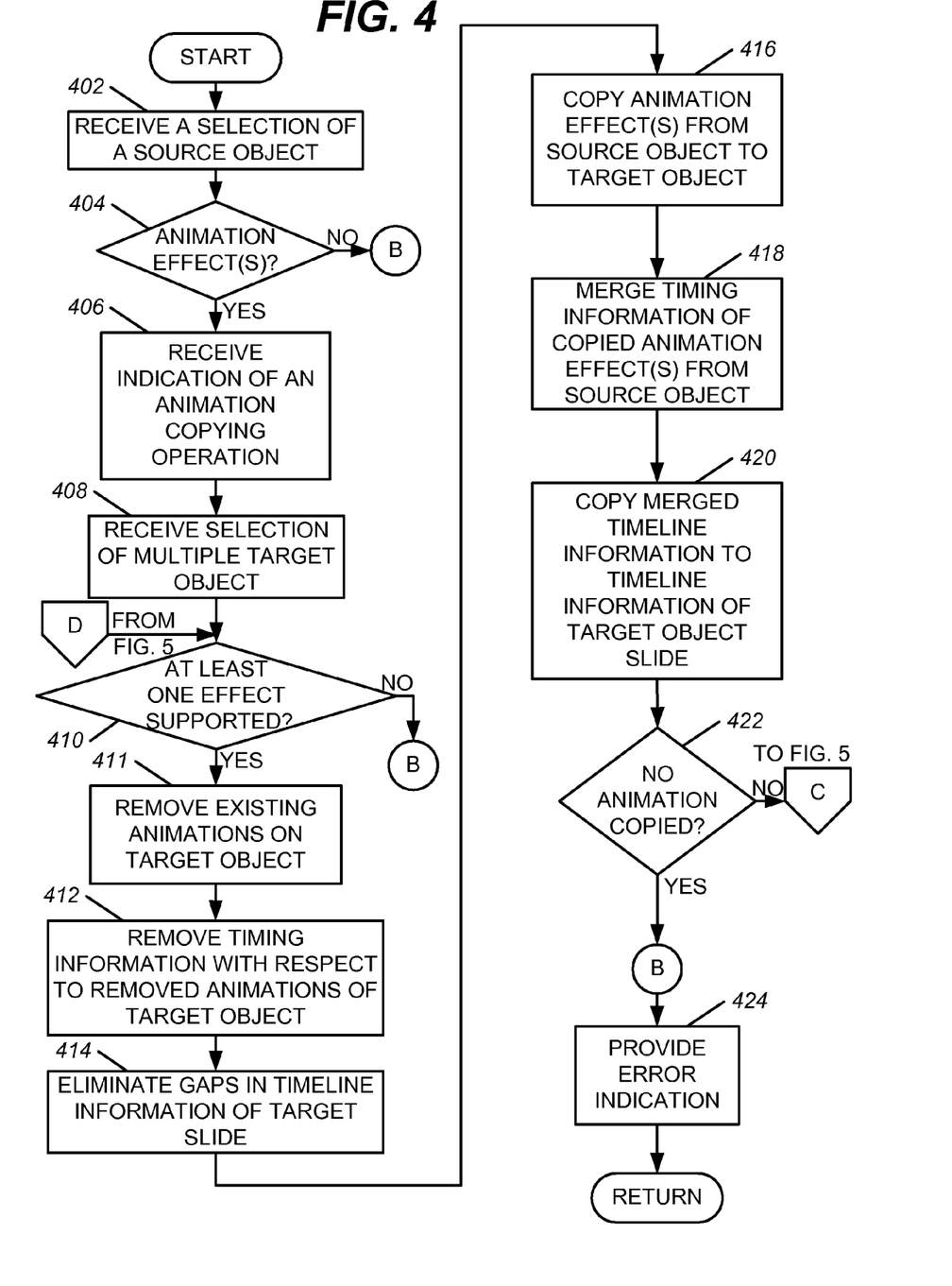
Figure 5:
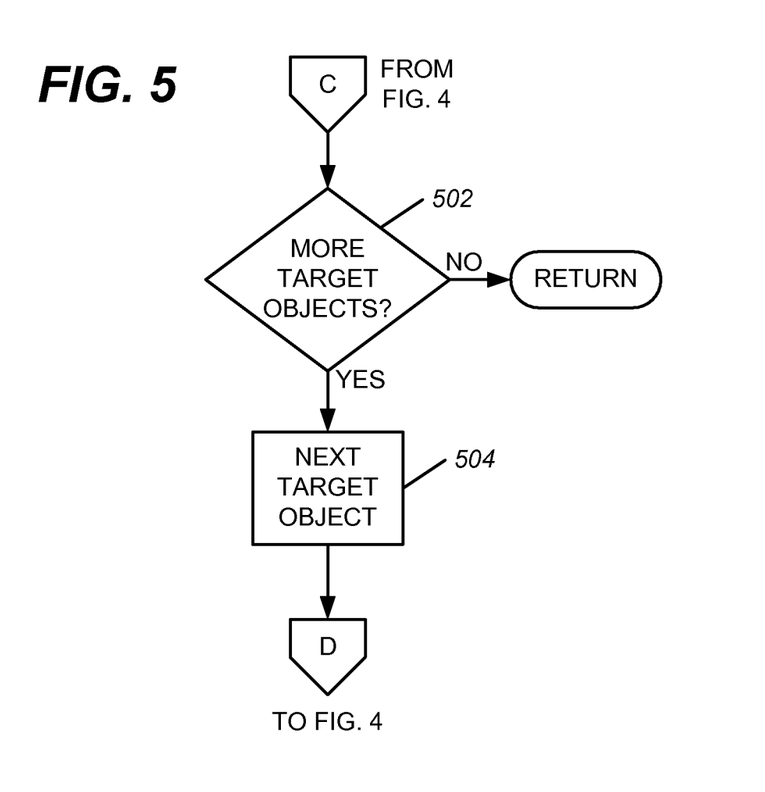

FIGS. 4 and 5 are flowcharts illustrating exemplary processing with respect to copying a source object to multiple target objects. The process may begin with a processing device, such as, for example, processing device 100, receiving a selection of a source object of a presentation (act 402). The source object may be an object included in a presentation slide of a presentation file or an object included in a presentation template, which may be used to create a presentation slide of a presentation. The processing device may then determine whether the selected source object has one or more associated animation effects (act 404).

If the processing device determines that the source object does not have any associated animation effects, then the processing device may provide an audio or visual error indication (act 424), as previously discussed.

If the processing device determines that the source object has one or more associated animation effects, then the processing device may receive an indication of an animation copying operation to multiple target objects (act 406). A user may provide the indication of the animation copying operation by double-clicking, with a pointing device, a displayed copy animation icon or text, by pressing one or more keys of a keyboard, or via other methods.

The processing device may then receive a selection of multiple target objects (act 408). The target objects may be objects included in a same presentation slide as the source object, a different presentation slide than the presentation slide having the source object, a presentation slide included in a different presentation file than the source object, or a presentation template, which may be used to create presentation slides.

As previously mentioned, a particular animation effect may be supported with respect to one type of object and may be unsupported with respect to another type of object. The processing device may determine whether any of the one or more animation effects of the source object are supported with respect to a target object (act 410). If none of the one or more animation effects of the source object are supported by the target object, then the processing device may provide an error indication (act 424). Otherwise, all existing animation effects on the target object may be deleted (act 411).

As mentioned previously, presentation slides and presentation templates, which include one or more animation effects, may have associated timeline information with respect to timing of the one or more animation effects of objects included in the presentation slides and the presentation templates. The processing device may remove timing information, with respect to the removed one or more animation effects of the target object, from the timeline information of the presentation slide including the target object or timeline information of the presentation template including the target object (act 412). Removal of the timing information, with respect to the removed one or more animation effects of the target object, may create gaps in the timeline information of the presentation slide including the target object or the presentation template including target object. The processing device may eliminate any gaps in the timeline information of the presentation slide including the target object or the presentation template including the target object (act of 414).

The processing device may then copy the one or more animation effects from the source object to the target object (act 416). The processing device may merge timing information, with respect to the copied one or more animation effects from the source object (act 418) and may copy the merged timing information to the timeline information of the presentation slide or the presentation template including the target object (act 420) as previously discussed.

Each animation effect may have one of a number of timings, which may be merged with timeline information of the presentation slide or the presentation template, including the target object, as previously described.

The processing device may determine whether any animation effects of the source object were successfully copied to the target object (act 422). If no animation effects were successfully copied, then the processing device may provide an audio or visual error indication (act 424), as previously discussed and the process may be completed. If any animation effects were successfully copied, then the processing device may determine whether there are any additional target objects (acts 502; FIG. 5). If there are no additional target objects, the process may be completed. Otherwise, processing, with respect to a next target object, may be performed (act 504) and act 410 (FIG. 4) may again be performed.

As previously mentioned, objects may include bulleted lists, diagrams, or charts, each of which may be a collection of several member objects having different animation effects and timings. Target objects may also include a collection of a different number of the member objects. In embodiments consistent with the subject matter of this disclosure, animation effects and timings of a first member object of a source object may be copied to all member objects of the target objects. If the first member object of the source object has no animation effect, then no animation effects may be copied from the source object to the member objects of the target objects.

In some embodiments, after a desired operation is selected, copy animation icon or text 210 may be highlighted until a target object is selected (when the desired operation is a copy animation to a single target object operation), or copy animation icon or text 210 may be highlighted until all multiple target objects are selected (when the desired operation is a copy animation to multiple target objects operation). Each of the multiple target objects may be selected by clicking on target objects with a pointing device, or via another method. An end of selecting of the multiple target objects may be indicated, in some embodiments, by clicking on a portion of a display in which target objects are absent, or via other methods.

In some embodiments, when performing a copy operation of one or more animation effects from a source object to multiple target objects, timing information, with respect to the one or more animation effects from the source object, may be merged with timeline information, with respect to a presentation slide or a presentation template including the target objects, such that animation of each of the target objects may occur serially. That is, animation with respect to a first target object may occur before animation with respect to a second target object, etc.

In some embodiments, when performing a copy operation of one or more animation effects from a source object to multiple target objects, timing information, with respect to the one or more animation effects from the source object, may be merged with timeline information, with respect to a presentation slide or a presentation template including the target objects, such that animation of each of the target objects may occur concurrently. In such embodiments, the timing information, with respect to each of the target objects, may indicate with previous type of timing.

In some embodiments, a copy operation of one or more animation effects from a source object to multiple target objects may be performed, such that the animations of the multiple target objects may be performed either serially or concurrently. A user may indicate a desire for serial or concurrent animations by selecting a modifier, which may be displayed on a display screen, by entering a command via a keyboard, by a manner in which target objects are selected, or via other methods.

In some embodiments, after successfully completing copying of one or more animation effects to a target object, a preview of the one or more animation effects may be displayed. For example, if a fly in animation effect is copied from a source object to a target object, upon successfully copying the animation effect to the target object, a fly in animation of the target object may be displayed as a preview.

CONCLUSION

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Although the above descriptions may contain specific details, they are not to be construed as limiting the claims in any way. Other configurations of the described embodiments are part of the scope of this disclosure. Further, implementations consistent with the subject matter of this disclosure may have more or fewer acts than as described with respect to FIGS. 3-5, or may implement acts in a different order than as shown. Accordingly, the appended claims and their legal equivalents define the invention, rather than any specific examples given.

We claim as our invention:

1. A machine-implemented method for replicating an animation effect from one object to another in a presentation file, the machine-implemented method comprising:
    receiving a selection, from a user, of a source object included in a presentation slide of the presentation file, the source object having an associated animation effect;
    receiving an indication of a desired operation for copying only the animation effect associated with the source object to one or more other objects in the presentation file; and
    in response to receiving the indication of the desired operation for copying only the animation effect associated with the source object,
        allowing the user to select a preexisting target object in either a preexisting target presentation slide or a preexisting target presentation template of the presentation file;
        receiving a selection of the preexisting target object; and
        in response to receiving the selection of the preexisting target object,
            deleting one or more animation effects from the selected preexisting target object; and
            subsequent to deleting the one or more animation effects from the selected preexisting target object, copying only the animation effect associated with the source object from the source object to the selected preexisting target object, wherein the method is implemented by a processing device.

2. The machine-implemented method of claim 1, further comprising:
    in response to receiving the selection of the preexisting target object,
        merging timing information of the animation effect associated with the source object to produce merged timing information;
        deleting timeline information from the preexisting target presentation slide, the deleted timeline information being related to the one or more animation effects of the selected preexisting target object; and
        subsequent to deleting timeline information from the preexisting target presentation slide,
            eliminating one or more gaps in the timeline information of the preexisting target presentation slide; and
            copying the merged timing information to the timeline information of the preexisting target presentation slide.

3. The machine-implemented method of claim 1, wherein:
    the desired operation further includes serially copying only the animation effect associated with the source object to each of a plurality of preexisting target objects, and
    copying only the animation effect includes copying the animation effect serially to each of the plurality of preexisting target objects.

4. The machine-implemented method of claim 3, wherein the copying only the animation effect to each of the plurality of the preexisting target objects is indicated by double-clicking on an operation icon with a pointing device.

5. The machine-implemented method of claim 1, wherein:
    the desired operation further includes copying only the animation effect associated with the source object to each of a plurality of preexisting target objects, and
    adding the copied animation effect to a timeline of the preexisting target presentation slide including the plurality of preexisting target objects, such that the copied animation effects are to be performed concurrently, with respect to each of the plurality of preexisting target objects.

6. The machine-implemented method of claim 1, wherein:
    the desired operation including copying only the animation effect associated with the source object to a plurality of preexisting target objects is indicated by double-clicking on an operation icon; and
    receiving a selection of each of the preexisting target objects by detecting a click on each of the plurality of preexisting target objects via a pointing device.

7. The machine-implemented method of claim 1, wherein the preexisting target presentation slide is different from the presentation slide that includes the source object.

8. A processing device comprising:
    at least one processor; and
    a memory connected to the at least one processor, the memory including instructions for the at least one processor to perform a method comprising:
        receiving, by the processing device, a selection of a source object, the source object having at least one associated animation effect;
        receiving, by the processing device, a selection of an operation for copying only at least one animation effect of the source object to at least one preexisting target object;

in response to receiving the selection of the operation for copying only the at least one animation effect of the source object,
receiving, by the processing device, a selection of the at least one preexisting target object; and
in response to receiving the selection of the at least one preexisting target object,
deleting any animation effects from the selected at least one preexisting target object and
subsequent to deleting animation effects from the selected preexisting target object, copying, by the processing device, only the at least one animation effect from the source object to the at least one preexisting target object.

9. The processing device of claim 8, wherein the copying only at least one animation effect from the source object to the at least one preexisting target object further comprises:
copying only the at least one animation effect from the source object to the at least one preexisting target object in a second preexisting presentation file, the second preexisting presentation file being different from a first presentation file including the source object.

10. The processing device of claim 8, wherein the copying only at least one animation effect from the source object to the at least one preexisting target object further comprises:
skipping copying of ones of the at least one animation effect of the source object to one of the at least one preexisting target object when the ones of the at least one animation effect is not supported by the ones of the at least one preexisting target object.

11. The processing device of claim 8, wherein the method further comprises:
providing, by the processing device, a preview of the at least one animation effect on one of the at least one preexisting target object.

12. The processing device of claim 8, wherein:
a first object of the source object and the at least one preexisting target object is included in a presentation template, and
a second object of the source object and the at least one preexisting target object is included in a slide of a presentation file.

13. The processing device of claim 8, wherein:
the receiving a selection of an operation for copying only at least one animation effect of the source object to at least one preexisting target object further comprises:
detecting a double-click of a pointing device on an icon for copying animation effects, and
the receiving a selection of at least one preexisting target object further comprises:
receiving a selection of a plurality of preexisting target objects when the double-click of the pointing device is detected on the icon for copying animation effects.

14. The processing device of claim 13, wherein the method further comprises:
subsequent to deleting animation effects from the selected preexisting target object,
copying the at least one animation effect from the source object to each of the plurality of preexisting target objects one at a time, and
adding timing information with respect to the at least one animation effect to a timeline of a presentation template or a presentation slide including a preexisting target object of the plurality of preexisting target objects.

15. A machine-implemented method for replicating an animation effect from one object to another in a presentation file, the machine-implemented method comprising:
receiving, from a user, a selection of a source object included in a presentation slide of the presentation file;
determining whether the selected source object includes at least one animation effect;
in response to determining that the selected source object includes at least one animation effect,
receiving a command to copy only the at least one animation effect associated with the source object; and
in response to receiving the command to copy only the at least one animation effect,
receiving a selection of a preexisting target object in the presentation file; and
in response to receiving the selection of the preexisting target object,
removing any existing animation effects of the selected preexisting target object from the selected preexisting target object; and
subsequent to removing the existing animation effects from the selected preexisting target object, copying only the at least one animation effect associated with the source object from the source object to the selected preexisting target object.

16. The machine-implemented method of claim 15, further comprising providing an error indication in response to determining that the selected source object does not includes at least one animation effect.

17. The machine-implemented method of claim 15, further comprising:
in response to receiving the selection of the preexisting target object,
determining whether the selected preexisting target object is compatible with the at least one animation effect associated with the source object; and
in response to determining that the selected preexisting target object is compatible with the at least one animation effect associated with the source object, allowing performance of:
removing any existing animation effects of the selected preexisting target object from the selected preexisting target object; and
subsequent to removing the existing animation effects from the selected preexisting target object, copying only the at least one animation effect associated with the source object from the source object to the selected preexisting target object.

18. The machine-implemented method of claim 15, further comprising:
in response to receiving the selection of the preexisting target object,
determining whether the selected preexisting target object is compatible with the at least one animation effect associated with the source object; and
in response to determining that the selected preexisting target object is not compatible with the at least one animation effect associated with the source object, providing an error indication without performing any of:
removing any existing animation effects of the selected preexisting target object from the selected preexisting target object; and
subsequent to removing the existing animation effects from the selected preexisting target object, copying only the at least one animation effect associated with the source object from the source object to the selected preexisting target object.

19. The machine-implemented method of claim 15, further comprising:
subsequent to removing the existing animation effects from the selected preexisting target object,
removing timing information with respect to the removed animation effects associated with the preexisting target object; and
eliminating one or more gaps in a timeline associated with a presentation slide as a result of removing the timing information of the removed animation effects from the preexisting target object, the presentation slide containing the selected preexisting target object.

20. The machine-implemented method of claim 15, further comprising:
subsequent to removing the existing animation effects from the selected preexisting target object,
removing timing information with respect to the removed animation effects associated with the preexisting target object;
eliminating one or more gaps in a timeline associated with a presentation slide as a result of removing the timing information of the removed animation effects from the preexisting target object, the presentation slide containing the selected preexisting target object; and
subsequent to copying only the at least one animation effect associated with the source object from the source object to the selected preexisting target object,
merging timing information of the copied at least one animation effect associated with the source object to produce merged timing information; and
copying the merged timing information to the timeline of the presentation slide containing the preexisting target object.

* * * * *